May 11, 1954 — J. D. DITSON — 2,678,056
CONTROL VALVE
Original Filed May 12, 1948

INVENTOR
J. D. DITSON
BY
HIS ATTORNEY

Patented May 11, 1954

2,678,056

UNITED STATES PATENT OFFICE 2,678,056

CONTROL VALVE

J. D. Ditson, Phillipsburg, N. J., assignor to Ingersoll-Rand Company, New York, N. Y., a corporation of New Jersey Original application May 12, 1948, Serial No. 26,549. Divided and this application October 25, 1951, Serial No. 253,059

2 Claims. (Cl. 137—87)

Figure 2:
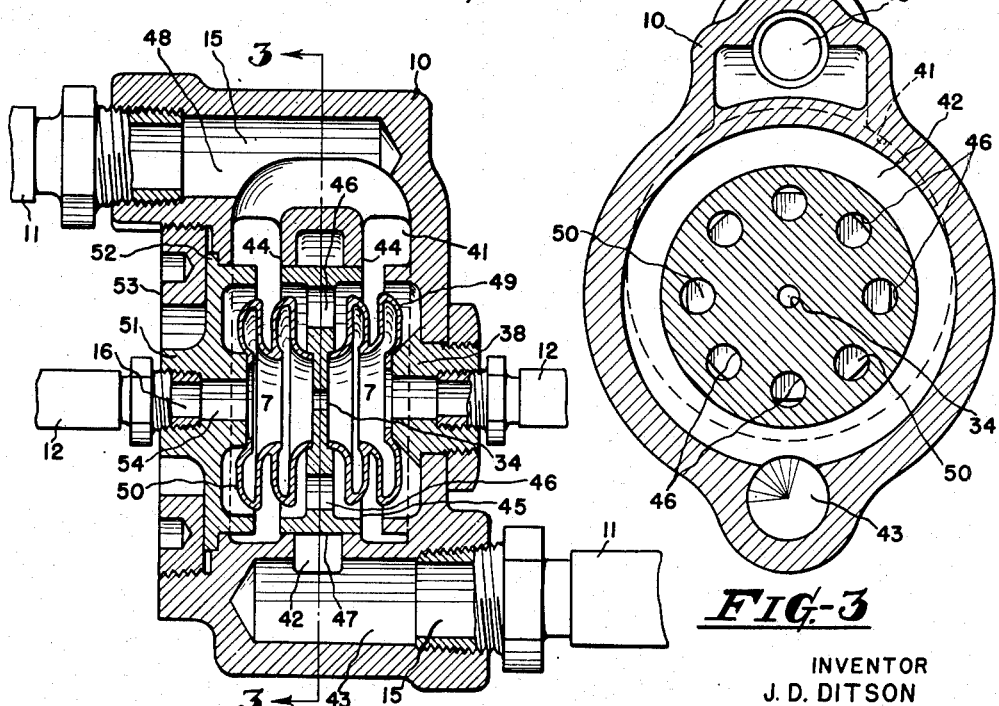
Figure 3:
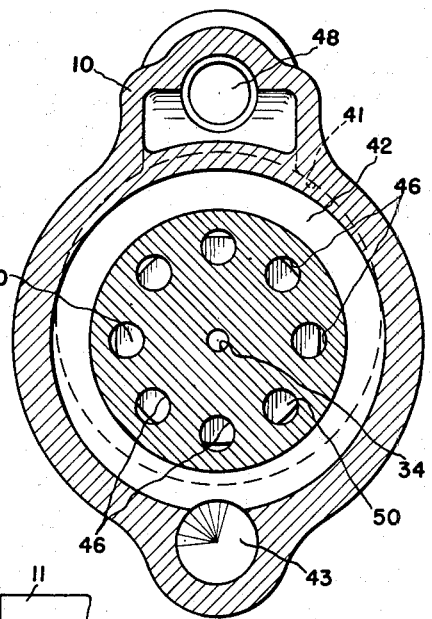

This is a divisional application from my co-pending application, Serial No. 26,549, filed May 12, 1948, now abandoned, for a Control Valve and has to do with the invention as disclosed in Figures 3 and 4 of the drawing. The invention shown in Figure 2 is claimed in the parent application.

This invention relates to a control valve unit in which the flow of one fluid is dependent on the flow of the second fluid, and more particularly to a valve unit intended for connection in the air and water supply lines of a rock drill to prevent the continued operation of the drill in the event the flow of water through the drill is disrupted.

It has been the practice to provide rock drills of the type to which this invention appertains, with mechanisms which prevent the operation of the drill in the event that the pressure of the water supplied to the rock drill should fall below a predetermined value. Many of these mechanisms, though effective in shutting down the rock drill in such an event, have been unsatisfactory in other respects. For example, many of these mechanisms are dependent on seals between relatively moving parts to prevent the air and water from being intermixed. This is of course unsatisfactory and in some cases extremely dangerous, in that after the seals have become worn some air leaks into the water and forms bubbles which will, in the course of the drilling, carry dust from the hole to contaminate the air breathed by the operator of the drill. Also, many of these mechanisms are dependent on the pressure of the water supply for their operation and it is readily obvious that the drill will continue to operate even though little or no water actually passes through the drill steel, as for example when the water passage is restricted or stopped up downstream from the mechanism.

It is accordingly one object of my invention to construct a control valve of the type to which this invention relates, which precludes the possible intermixing of the fluids.

Another object of my invention is to make the flow of one fluid dependent on the amount of flow of another fluid.

Other objects will be in part obvious and in part pointed out hereinafter.

Figure 1:
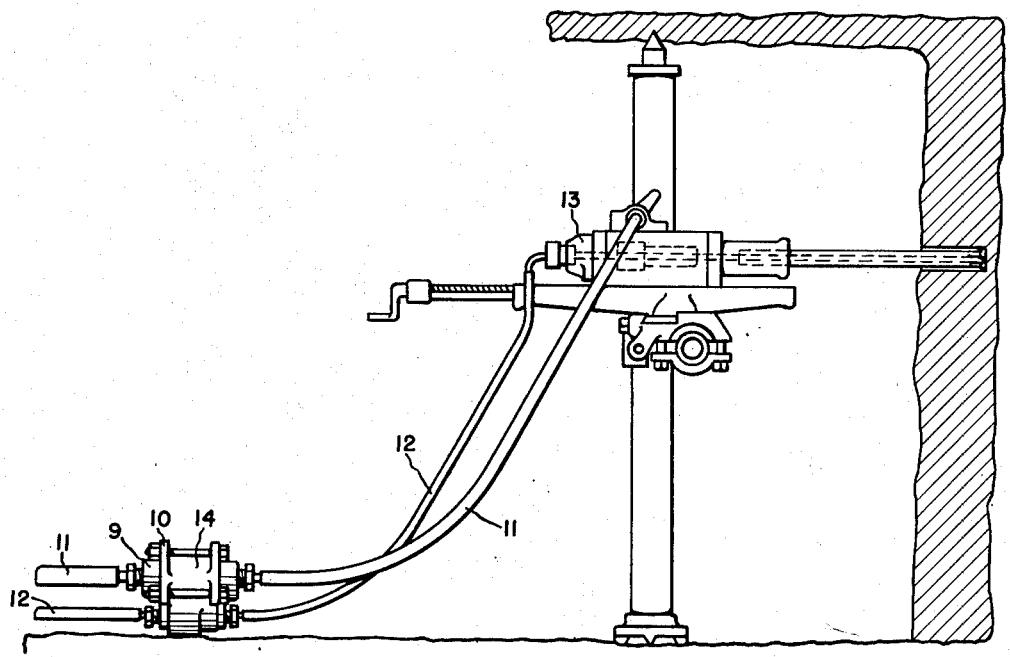

In the drawings accompanying this specification and in which similar reference numerals refer to similar parts, Figure 1 is a side view of a rock drill embodying the present invention and a mounting for a rock drill, Fig. 2 is a sectional elevation of the present invention, and Fig. 3 is a transverse view of Figure 2 taken along the line 3—3.

Referring to the drawings, 10 designates, in general, a valve unit connected in the air and water supply lines 11 and 12 respectively, for a rock drill 13. The valve body of the unit 10 has a pair of passages 15 and 16 for air and water, and within the air passage 15 is a valve means for controlling the flow of air therethrough actuated by the flow of water through the passageway 16.

The intermediate portion of the air passage 15 forms a chamber 41 having an annular groove 42 therearound which is in communication with the outlet end 43 of the air passage 15. The portion of the valve body which forms the open or mouth portion of the groove 42, protrudes into the chamber 41 to form parallel ridges 44 which served as a seal for the valve member 45. The valve 45, in this instance, is wheel shaped with its axis transverse from the flow of fluid through the chambers 41, and so positioned it separates chamber 41 into compartments which are communicated through holes 46 in the member 45. The outer flange portion or rim 47 of the member 45 cooperates with the ridges 44 to cut off communication between the chambers 41 and the groove 42, or effectively, between the inlet and outlet ends 48 and 43 in the air passage 15.

The valve 45 is held in position by resilient members such as the metallic bellows 49 and 50 attached on the opposite sides of the valve and encircling the central perforation or orifice 34 therein. The bellows 49 and 50 are impervious to fluid and define fluid tight expansible chambers on the opposite sides of the valve 45 and have their ends secured in a fluid tight manner to the members to which they are adapted. The outer end of the bellows 49 is attached to a member 38 in a fluid tight relationship while the other end of the bellows 50 is secured to a circular member 51 having a peripheral flange 52 which is held against the valve body by a nut 53 threaded in the valve body. The member 51 is of at least the same diameter as the valve 45 to permit easy access to the moving parts of the control unit.

A passage 54 through the member 51 communicates the water line 12 with the bellows 50 so that the resilient members 49 and 50 cooperate with the orifice 34 to form from that portion of the water passage which extends transversely through the air passage 15. With this arrangement transverse movement of the valve member 45 for establishing or cutting off communication between the groove 42 and the chamber 41 will occur in accordance with a flow of water through the orifice 34 of an arbitrarily selected order.

In operation the spring bellows 49 and 50 exert equal pressures on the valve member 45 so that communication is cut off between the chamber 41 and the groove 42 whenever the amount of flow of water through the orifice 34 or the pressure differential between the chambers 7 is below a predetermined value. However, when the amount of flow through the orifice exceeds said value the pressure drop in the downstream side of the valve member 45 will be sufficient to bias the valve into the open position and thereby establish communication between the chamber 41 and the groove 42. It is to be noted here that due to the construction of the valve, the operation of the valve is independent of the direction of flow of either fluid therethrough.

It is apparent from the above discussion that the control unit herein disclosed and described provides a relatively simple yet highly sensitive means of making the flow of fluid in one passage dependent on the rate of flow of fluid in another passage, and in which the possibility of leakage of fluid from one passage to the other is reduced to a minimum.

While I have shown and described a specific form of my invention, it is to be understood that various changes and modifications may be made without departing from the spirit of the invention as set forth in the appended claims.

I claim:

1. A valve unit for connection in air and water supply lines of a rock drill, comprising a valve body having an air passage and a water passage, valve means for controlling the air passage, resilient members located in the air passage and forming a portion of the water passage, means attached to said members for creating a pressure differential in the water flowing through said members, and means acting responsively to said pressure differential for directly actuating said valve.

2. A valve unit for connection in the air and water supply lines of a rock drill, comprising a valve body having separate air and water passages, a member in the water passage and having an orifice therethrough, bellows secured to the opposite sides of said member and encircling the orifice, said bellows forming a section of the water passage, seating surfaces located in the air passage, and a rim on the said member for cooperating with the seating surfaces in the air passage to control the flow of air therethrough.

References Cited in the file of this patent

UNITED STATES PATENTS

| Number | Name | Date |
| --- | --- | --- |
| 1,699,163 | Schiske | Jan. 15, 1929 |
| 1,850,051 | Sponar | Mar. 15, 1932 |
| 2,154,777 | Schlalos | Apr. 18, 1939 |
| 2,371,720 | Stine | Mar. 20, 1945 |

FOREIGN PATENTS

| Number | Country | Date |
| --- | --- | --- |
| 784,210 | France | July 22, 1935 |